UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC-LIKE SUBSTANCE.

1,084,337. Specification of Letters Patent. Patented Jan. 13, 1914.

No Drawing. Application filed March 20, 1911. Serial No. 615,669.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Vulcanized Caoutchouc-Like Substances, of which the following is a specification.

By our application Ser. No. 594557 the production of a new caoutchouc like substance is described, which is obtained by polymerizing alpha-methylerythrene. It has now been found that this caoutchouc like substance can be vulcanized, substances being obtained equal to and some even better than vulcanized natural caoutchouc. These facts could not be foreseen in the existent state of knowledge with regard to the nature and the processes during the vulcanizing of caoutchouc. One could not know if this new caoutchouc-like substance too would show the same behavior to vulcanizing agents as the natural caoutchouc does. Still less could one predict, whether the vulcanized product, if it could be obtained at all, would have the same valuable properties of vulcanized caoutchouc.

In order to illustrate our invention the following examples are given, the parts being by weight:—

Example 1: 5 parts of the caoutchouc like substance obtained by the polymerization of alpha-methylerythrene are dissolved in 100 parts of benzene. A solution of one part of sulfur monochlorid ($S_2Cl_2$) in 50 parts of carbon disulfid ($CS_2$) is added and the mixture is allowed to stand for 1.5 to 2 minutes, and is then poured into alcohol. On stirring a substance separates which is distinguished from the parent material by being of greater toughness and of better resistance to different agents. It is grayish in color and not adhesive.

Example 2: 50 parts of the caoutchouc like substance obtained by polymerization of alpha-methylerythrene are intimately mixed by means of mixing rolls with 15 parts of powdered sulfur. The product shaped from the resulting sheet is then heated in a suitable apparatus for from 5 to 6 hours at 150–160° C.

Example 3: 100 parts of the product of polymerization obtained from alpha-methylerythrene are carefully worked together with 10 parts of sublimed sulfur in a mixing apparatus provided with rolls until a perfectly homogeneous mass results. The resulting product is brought into the desired shape and is then subjected in an iron vulcanizing vessel to the action of steam under a pressure of 3–4 atmospheres. After from 1–2 hours the process is complete.

Instead of the product of polymerization used in the examples a mixture of the caoutchouc like product obtained from alpha-methylerythrene with natural caoutchouc can be used; other methods of vulcanization can also be employed.

The novel caoutchouc substance of the present invention forms an ozonid which upon decomposition with water yields the 2-methyl derivatives of succinic aldehyde,

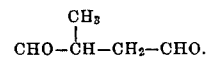

Vulcanized mixtures of alpha-methylerythrene caoutchouc and of natural caoutchouc form ozonids which yield upon decomposition with water both levulinic aldehyde and the isomer referred to above.

We claim:—

1. As a new product a vulcanized caoutchouc-like substance comprising vulcanized alpha-methylbutadiene caoutchouc being a grayish non-adhesive substance containing sulfur and forming an ozonid which upon decomposition with water yields the 2-methyl derivatives of succinic aldehyde.

2. As a new product a vulcanized caoutchouc-like substance comprising a vulcanized mixture of natural caoutchouc and alpha-methylbutadiene caoutchouc being a grayish non-adhesive substance containing sulfur and forming an ozonid which upon decomposition with water yields both levulinic aldehyde and the isomeric 2-methyl derivative of succinic aldehyde.

In testimony whereof we have hereunto set our hands in the presence of two subscribing witnesses.

FRITZ HOFMANN. [L. S.]
CARL COUTELLE. [L. S.]

Witnesses:
CHAS. J. WRIGHT,
ALFRED HENKEL.